UNITED STATES PATENT OFFICE 2,362,292

LUBRICANT

John G. McNab, Roselle, N. J., assignor to Standard Oil Development Company, a corporation of Delaware No Drawing. Application December 30, 1939, Serial No. 311,837

14 Claims. (Cl. 252—48)

This invention relates to a novel type of metal compound and methods of preparing same, and relates more particularly to the use of these novel compounds as addition agents in hydrocarbon compositions, especially lubricating oils, for improving same.

It has been found that hydrocarbon compositions, especially hydrocarbon lubricating oils, are greatly improved by adding thereto a small amount of metal compound such as a magnesium salt of tertiary amyl phenol thioether, which might also be called a sulfide of a magnesium tertiary amyl phenolate. It is believed to have the formula:

$$[Mg(C_5H_{11}-C_6H_3-O)_2S]_n$$

where $n$ may be one or more. If the various groups attached to the aromatic nucleus are so positioned that the amyl group is in an ortho position to the oxygen and the sulfur linkage is in a meta position to the oxygen, this compound, in its simplest form, probably has the following graphic formula:

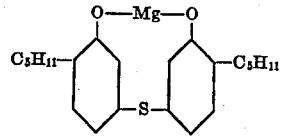

It should be understood that the position of the various substituents around the aromatic nucleus may be varied without departing from the scope of the invention.

A similar disulfide compound may be used in which the group —S— in the above graphic formula is replaced by the group

or if preferred by the group —S—S—, or even higher polysulfides may be used.

These various compounds can be produced by preparing the corresponding alkyl phenol sulfides or disulfides, which per se are known, and converting these directly into the corresponding magnesium salt by heating with a solution of magnesium methylate in methyl alcohol, or by other suitable means.

The invention may be described more broadly as comprising a substituted phenolate compound of magnesium containing at least one grouping having the general formula:

$$-Mg-Y-Ar(X)_n$$

wherein Y is an element in the righthand side of group VI of the periodic table (Mendeleeff), Ar is an aromatic nucleus which contains like or unlike substituents, X, $n$ in number, replacing nuclear hydrogen, $n$ being at least one.

The substituents, X, may be organic, inorganic, or both, for example, alkyl radicals and groups containing one or more of the non-metallic elements belonging to groups V, VI, and VII of the periodic system (Mendeleeff): nitrogen, phosphorus, oxygen, sulfur, and halogens, as in amino, nitro, phosphite, phosphate, hydroxy, alkoxy, sulfide, thioether, mercapto, chloro groups, and the like.

In the phenolate salts constituting blending agents featured by this invention, valences of the metal other than those connected to the substituted phenolic radicals, such as —O—Ar(X)$_n$, are connected through oxygen to other organic groups or to inorganic constituents, such as hydrogen, phosphorus, etc. For convenience, non-phenolic radicals or groups, as well as phenolic groups, attached to the metal are indicated broadly by —O·R in the following types of compositional formulae, which broadly represent magnesium derivatives of substituted phenolic compounds containing the characteristic compositional grouping described:

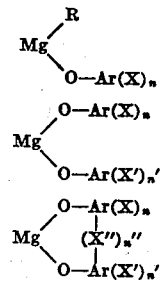

Where oxygen is shown in these formulae, it may be replaced by sulfur, selenium or tellurium, as in the case of thiophenolic compounds.

More specifically, some of the structures which the substituted phenolates may have are indicated in the following list of formulas containing benzene nuclei of compositions —C$_6$H$_4$—, —C$_6$H$_3$—, etc., with X, as before, standing for nuclear substituents (e. g., —C$_n$H$_{2n+1}$, —NO$_2$, —Cl, —S—, —S$_2$—, —NH$_2$, —NH(C$_n$H$_{2n+1}$), etc.):

R—Mg(O C$_6$H$_4$X)
Mg(—O—C$_6$H$_4$—X)$_2$
Mg[—O—(X)C$_6$H$_3$—]$_2$X'
Mg(—O—C$_6$H$_4$—)$_2$X
Mg(—O—C$_6$H$_3$(X)—X'$_n$—C$_6$H$_3$(X'')—OH)$_2$
Mg[—O—(X)C$_6$H$_3$—]$_2$X'$_n$
Mg[—O—(X)C$_6$H$_3$—]$_2$X'=X''

$$Mg\begin{bmatrix} -O-C_6H_4- \\ -O-(X)C_6H_3- \end{bmatrix}X'_n$$

Corresponding magnesium derivatives of the following illustrative types of substituted phenolic compounds are among those that can be used, in which R represents an alkyl group, preferably having at least 4 carbon atoms:

Group A

HO—C₆H₄R
HO—C₆H₃(R)R'
HO—C₆H₂(R)(R')R''
HO—(R)C₆H₃—O—C₆H₃(R)—OH
[HO—(R)C₆H₃O]₃P
HO—(R)C₆H₃—O—CH₂—C₆H₄—OH
HO—(R)C₆H₃—CH₂—O—C₆H₃(R')—OH
HO—(R)C₆H₃—P(OH)—C₆H₃(R)—OH
HO—(R)C₆H₃—CH₂NH—C₆H₃(R)—OH
HO—(R)C₆H₃—CH(Cl)—CH₂—C₆H₃(R)—OH

All these compounds when employed in high temperature lubrication service tend to corrode such sensitive engine parts as copper-lead and cadmium-silver bearings. This characteristic can usually be corrected by including, in the lubricating composition, suitable anti-oxidants or other anti-corrosion agents, e. g. benzyl para-amino phenol, alpha naphthol, tertiary amyl phenol sulfide, triphenyl phosphite, dibutyl amine, etc. It may be mentioned that metallic soaps of carboxylic acids are considerably more corrosive than the phenolic salts of this invention and that their corrosiveness is less amenable to correction by the use of anti-oxidants, etc.

This corrosion problem also can be at least partially and in most cases completely taken care of by chemically incorporating an element of the sulfur family (i. e. S, Se, and Te), preferably sulfur, into the structure of the substituted phenolate salts of magnesium, thus making unnecessary the addition of any separate anti-corrosion agent. Thus the magnesium derivatives of the following illustrative types of substituted phenolic compounds are preferred over those listed in Group A above.

Group B

HO—(R)C₆H₃—S—C₆H₃(R)—OH
HO—(R)C₆H₃—S—S—C₆H₃(R)—OH
HO—(R)C₆H₃—S(=S)—C₆H₃(R)—OH $$\text{HO—(R)C}_6\text{H}_3\text{—S—C}_6\text{H}_3\text{(R)—OH} \\ \quad \quad \quad \quad |\text{—NH—}|$$

HO—(R)C₆H₃—S—C₄H₉
  (may be branched or straight chain)
HO—(R)C₆H₃—S—CH₂—C₆H₅
HO—(R)C₆H₃—CH₂—S—CH₂—C₆H₃(R)—OH
HO—(R)C₆H₃—S—CH₂—C₆H₃(R)OH
HO—(R)C₆H₃—S—(CₙH₂ₙ)—OH
HO—(R)C₆H₃—S—C₆H₃(R)—(CₙH₂ₙ)—OH
HO—(OR)C₆H₃—S—C₆H₃(OR)—OH
HO—(OR)C₆H₃—S—C₆H₂(R')(OR)—OH
HO—(R)(NH₂)C₆H₂—S—C₆H₂(NH₂)(R)—OH
HO—(R)(OH)C₆H₂—S—C₆H₂(OH)(R)—OH
HS—(R)C₆H₃—S—C₆H₃(R)—OH $$\text{HO—(R)C}_6\text{H}_2\text{—S—C}_6\text{H}_2\text{(R)—OH} \\ \quad \quad \quad \quad |\text{—S—}|$$

HO—(R)C₆H₃—S—C₆H₃(R)—OR
HO—(R)C₆H₃—S—C₆H₄—R
HO—(R)C₆H₃—S—(CₙH₂ₙ)—NH₂
HO—(R)C₆H₃—S—C₆H₃(R')—R''
HO—(R)(COR)C₆H₂—S—C₆H₂(R)(COR)—OH
[HO—(R)C₆H₃—S—C₆H₃(R)O]₃P
[HO—(R)C₆H₃—S—C₆H₃(R)O]₃PO

These preferred phenolates may also contain sulfur in other positions or groups at the same time as in the places shown in the formulas in Group B. Furthermore, the formulas in Group A may have sulfur incorporated therein. More broadly it may be stated that inorganic substituents, particularly negative inorganic groups containing non-metallic elements of groups V, VI, and VII of the Mendeleeff Periodic System, beneficially influence the phenolates by increasing their potency for stabilizing the lubricating oils and by making the phenolates, in themselves, more stable, as for instance, against hydrolysis.

Especially preferred, because they are both very efficient and also lend themselves to easy and economical manufacture, are compounds containing at least one grouping having the general formula:

$$\begin{array}{c} -Mg- \\ | \\ R-Ar-Z_n- \end{array}$$

where Ar is an aromatic nucleus, R is an organic group, Z is a member of the sulfur family, and $n$ is an integer of 1 to 5. Z is preferably sulfur, and $n$ is preferably 1 or 2. R represents an organic group which may be either aryl, alkyl, alkaryl, aralkyl or cycloalkyl, and which may contain substituent groups such as halogen, particularly chlorine, nitro, nitroso, amino, hydroxy, carboxy, alkoxy, aroxy, mercapto, and the like, but R preferably is or contains an alkyl or alkylenyl group, and preferably contains at least 4 carbon atoms but may contain many more, such as 8, 10, 16, 18, etc.

The configurations of the compounds are not limited to certain positions for the substituent groups, for these may be in ortho, para, or meta relations to one another. Also, the substituents, X, in broader formulas discussed previously in any aromatic nucleus may be alike or different.

The aromatic nucleus may be polycyclic as in naphthalene, phenanthrene, diphenyl, etc. Where oxygen occurs, it may be replaced by sulfur, selenium, or tellurium, as in the case of thiophenolic compounds.

An important feature of this invention issues from the observation that metal phenolates are benefited in solubility and effectiveness as hydrocarbon lubricating oil blending agents when they contain a total of at least 8 and preferably 10 or more carbon atoms per molecule in aliphatic groupings, when sulfur is present in the molecule, and at least 16 carbon atoms and preferably 18 or more, if no sulfur is present.

Specific examples of preferred substituted phenolates falling into the classes mentioned, having at least one alkyl radical as a substituent are formulated as follows:

I. Alkyl phenolates $$Mg(O-C_6H_4-C_nH_{2n+1})_2$$
$$Mg[O-C_6H_3(C_nH_{2n+1})_2]_2$$

e. g. salts of tert-octyl phenol
  salts of octadecyl phenol
  salts of di(tert.)amyl phenol II. Alkyl chlorphenolates $$Mg(O-C_6H_3Cl-C_nH_{2n+1})_2$$
$$Mg(O-C_6H_2Cl_2-C_nH_{2n+1})_2$$
$$Mg[O-C_6H_2Cl(C_nH_{2n+1})_2]_2$$

e. g. salts of 2 chloro, 4 octadecyl phenol
  salts of 2,6 dichloro, 4 tert-octyl phenol
  salts of 6 chloro, 2,4 di(tert.)amyl phenol III. Alkyl amino phenolates $$Mg\{O-C_6H_3[CH_2N(C_xH_y)_2](C_nH_{2n+1})\}_2$$

e. g. salts of dicyclohexyl amino methyl tert-octyl phenol

IV. Thioethers of alkyl phenolates $$Mg[O—C_6H_3(C_nH_{2n+1})]_2S$$
$$Mg[O—C_6H_2(C_nH_{2n+1})_2]_2S$$

e. g. thioether of salts of tert-octyl phenol
thioether of salts of tertiary amyl cresol V. Disulfides of alkyl phenolates $$Mg[O—C_6H_3—C_nH_{2n+1}]_2S_2$$

e. g. salts of tert. amyl phenol disulfide

VI. Phosphorus acid esters of alkyl phenol sulfides $$Mg_3[O—C_6H_3(C_nH_{2n+1})S(C_nH_{2n+1})—C_6H_3—O]_6P_2$$

e. g. salts of tert. amyl phenol sulfide monophosphite

As these substituted phenolates are generally made by reacting the corresponding phenols with magnesium hydroxide, the amount of metal in the final phenolate product will depend on proportions of reactants used, and since products having different proportions are possible, the product will usually consist of a mixture, which may be used as such or be separated into its several constituents.

As suggested above, the magnesium compounds of this invention preferably have the general formula:

$$Mg[—(R)Ar—O]_2S_x$$

where $x$ is 1 or 2, R represents one or more alkyl groups, having enough carbon atoms, preferably a total of at least 10, to insure solubility of the compounds in mineral oil. More particularly still, compounds having the following general formula are preferred:

$$Mg[—(R)C_6H_3—O]_2S$$

For the objects stated, the magnesium phenolates have been preferably prepared from phenolic compounds readily obtainable by synthetic alkylation of the simple phenols and cresols or by extraction from high-boiling petroleum oils.

Suitable synthetic alkyl phenols for preparing the desired phenolates are principally of the secondary and tertiary types, because alkylation of a simple phenol occurs more readily with branched aliphatic reactants. Commonly, the alkylation reaction involves a condensation of olefins with the simple phenols, the reaction being catalyzed by anhydrous metal halides, sulfuric acid, phosphoric acid, or certain activated clays. As olefinic reactants, refinery gases containing propylene, butylenes, amylenes, etc., are economically useful, although individual olefins, e. g. isobutylene, iso-amylene, di-isobutylene, tri-isobutylene, etc., or olefin-containing mixtures from other sources may be used. The reaction temperature is usually controlled to avoid side reactions. In employing sulfuric acid, a liquid phase reaction at relatively low temperatures is preferred; with phosphoric acid the reaction may be carried out in the vapor phase.

As starting materials for conversion into the magnesium phenolates, the phenols may contain one or more substituents which provide a desired number of carbon atoms in groups having the form of straight chains, branched chains, or even rings. Mono-alkyl or poly-alkyl phenols are synthesized conveniently by alkylating a phenol with branched chain olefin polymers, such as diisobutylene, tri-isobutylene, di-tert. amylene, or other suitable agents, such as alcohols, alkyl sulfates, alkyl phosphates, or alkyl halides, thereby forming carbon-to-carbon bonds between the aromatic nucleus and the alkyl groups.

Petroleum phenols which qualify for the present purpose are considered to contain polymethylene or cycloalkyl side chains, as evidenced by their hydrogen and carbon analysis. The petroleum phenols are obtained by extraction of various stocks, chiefly from cracking process heating oil stocks, with caustic soda, and acidification of the alkaline extract with a weak mineral acid followed by a non-destructive distillation, if desired.

By using the described methods or any other well known method for preparing alkyl phenols, the following alkylated phenols may be procured for preparing the phenolates: tert.-amyl phenols, i. e., iso-hexyl phenol, tert-octyl phenol, di-tert.-butyl phenol, di-(tert-octyl) phenol, etc.

Inorganic substituents are introduced into alkyl phenols by well known methods. For example, an alkyl phenol, e. g. tert.-amyl phenol, is reacted with sulfur mono-chloride, $S_2Cl_2$, in about a 1:½ mol ratio and preferably in a solvent such as dichlorethane, to produce the alkyl phenol disulfide. Using substantially the same procedure but substituting sulfur dichloride, $SCl_2$, for the mono-chloride, the alkyl phenols are given a thioether linkage substituent. Alkyl chlorphenols are obtained by chlorination, preferably controlled to replace nuclear hydrogen by a chloro group. This may be accomplished by chlorinating the phenol before alkylation. In such a manner, for example, 2-chlor-4-tert.-amyl phenol can be produced. Nitro substituents are introduced readily into the aromatic nucleus by direct nitration, and nitro substituents can be reduced to amino groups. It is to be understood, however, that the preparation of substituted phenolic compounds which have been described does not form part of this invention and that any of the well known methods for their production may be used.

The invention will be better understood from a consideration of the following experimental data:

EXAMPLE 1

165 grams of magnesium chloride $MgCl_2 \cdot 6H_2O$ were heated in a stream of hydrogen chloride to 170° C. when water began to come off. Then the temperature was gradually raised to 360° C., as the evolution of water started to slacken, and maintained at 360 to 370° C. for about 5 hours, with a stream of dry nitrogen passing through the flask to remove hydrogen chloride. A yield of 76 grams of anhydrous magnesium chloride was obtained. This material dissolved in absolute ethyl alcohol with the evolution of much heat.

⅛ mol (16 grams) of this anhydrous magnesium chloride was dissolved in about 200 ccs. of absolute ethyl alcohol and the solution added with agitation to an alcohol solution of sodium tertiary amyl phenol sulfide, resulting from the reaction of 7.7 grams (⅓ mol) of sodium dissolved in 150 ccs. of absolute alcohol with 60 grams (⅛ mol) of tertiary amyl phenol sulfide dissolved in 110 ccs. of absolute ethyl alcohol. A precipitate formed. The mixture was refluxed for 20 minutes and then filtered hot to remove the sodium chloride produced by the reaction. Alcohol was stripped off from the filtrate under high vacuum and a residue comprising a magnesium salt of tertiary amyl phenol sulfide was obtained. Upon analysis it was found to contain 5.50% of magnesium oxide MgO (the theoretical content of MgO, based upon the assumed formula Mg($C_5H_{11}$—$C_6H_3$—O)$_2$S would be 10.61%), and it was found to be oil-soluble.

EXAMPLE 2

6 grams (4.1 grams=⅙ mol) of metallic magnesium were reacted with 150 ccs. of anhydrous ethyl alcohol by heating. A small amount of mercury chloride $HgCl_2$ and iodine were added as catalysts. The mixture was refluxed for 24 hours. 60 grams (⅙ mol) of tertiary amyl phenol sulfide dissolved in 150 ccs. of absolute ethyl alcohol were added and the whole mixture was refluxed for 24 hours and then filtered hot. The filtrate was stripped free of solvent, and a 40-gram yield of a yellow solid was obtained. This product was a magnesium salt of tertiary amyl phenol sulfide and was oil-soluble. Upon analysis it was found to contain 13.48% of magnesium oxide MgO.

EXAMPLE 3

A large batch (about 250 lbs.) of magnesium tertiary amyl phenol sulfide was prepared by the same general method as described in Example 2. The magnesium was dissolved in methyl alcohol to form magnesium methylate, using a large excess of methyl alcohol as solvent. A solution (about 33% concentration) of tertiary amyl phenol sulfide in methyl alcohol was added to the solution of magnesium methylate. A substantial proportion of the resultant magnesium tertiary amyl phenol sulfide precipitated but some remained in solution. The entire batch was therefore evaporated to dryness and the residue of magnesium tertiary amyl phenol sulfide was then dissolved directly in a lubricating oil base stock. In this case a 10% stock solution was made in a naphthenic oil having a viscosity of about 55 secs. Saybolt at 210° F., the solution was filtered to remove a very small amount of magnesium oxide (apparently formed as an impurity), and then the purified stock solution was diluted down to the 1% concentration with the lubricating oil base stock in which it was to be used. In order to test the uniformity of this magnesium salt, a large number of samples were taken and upon analysis it was found that all of these samples contained between 10.0 and 11.0% of magnesium oxide MgO, thereby indicating a very satisfactory uniformity. The entire batch averaged 10.6% MgO which is substantially identical with the theoretical amount of 10.61% based on the formula Mg($C_5H_{11}$—$C_6H_3$—O)$_2$S.

EXAMPLE 4

Magnesium tert-octyl phenol sulfide

The method described in Example 2 for the preparation of tertiary amyl phenol sulfide was repeated substantially identically except that instead of using tertiary amyl phenol sulfide as one of the raw materials, the corresponding tert-octyl phenol sulfide was used instead, being added to the magnesium methylate in the form of a methyl alcohol solution thereof. The resulting product formed was magnesium diisobutyl phenol sulfide which probably has the formula:

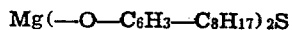

Mg(—O—$C_6H_3$—$C_8H_{17}$)$_2$S

This product was found upon analysis to contain 8.23% MgO (theoretical 8.33) and is readily soluble in mineral lubricating oils.

Corresponding magnesium salts of other alkyl phenol sulfides may be prepared; for instance, by substituting polysulfides or polymers such as the dimers, trimers, and tetramers, of the alkyl phenol thioethers, disulfides, and the like, in place of the alkyl phenol thioethers used in the above examples. Also, the corresponding magnesium salts of the corresponding selenides and tellurides may be prepared, although the sulfur compounds are preferred.

The various products obtained may be purified, if desired, by fractional crystallization, extraction, precipitation with selective solvents, etc. Also, impurities may be removed by treatment with suitable adsorptive agents such as clay.

While these compounds or mixtures thereof, alone or in admixture with corresponding alkyl phenol sulfides, may be added in any desired concentration within their solubility limits to lubricating oils, they are preferably used in concentrations of about 0.01 to 2.0%, about 0.1 to 1.0% being generally sufficient to improve engine performance properties of the majority of lubricating oils. Larger amounts up to 5% or more may be used to improve the lubricating or oiliness characteristics of the lubricating oils.

These magnesium compounds may also be used as improving agents in other hydrocarbon oils or products, such as waxes, fuel oils, Diesel fuels, naphthas, gasoline, burning oil, and the like.

These magnesium compounds may also be used as oxidation inhibitors or to improve other properties in products derived from petroleum oils or in different types of products such as fatty oils, soaps, aldehydes, resins, rubber, paper, and various synthetic products which tend to deteriorate by oxidation either alone or in accompaniment with other chemical phenomena.

The magnesium compounds of this invention are especially useful for improving mineral lubricating oils, particularly those used for crankcase lubrication of internal combustion engines, and other oils which are used at elevated temperatures such as above 150° or 200° F. These oils may be obtained from various types of crudes such as paraffinic, naphthenic, asphaltic, or mixed crudes, and they may be either plain distillates or fractions obtained by treating or refining in various methods known to the art such as acid treating, clay treating, solvent extraction, dewaxing, etc., or they may be synthetic oils resulting from various types of chemical reactions such as cracking, polymerization, condensation, and the like.

In preparing finished lubricants according to this invention, other known addition agents may also be used such as dyes, soaps, pour inhibitors, sludge dispersers, oxidation inhibitors, mutual solvents, etc.

For instance, such substances as esters, ketones, alcohols, chlorinated solvents, etc. are often useful in assisting more poorly soluble salts into solution, particularly where alkyl groups of the recommended size are not present.

Although the invention is of primary importance for preparing Diesel engine lubricants, it is also useful for other types of crankcase lubricants, steam cylinder oils, greases, upper cylinder lubricants, slushing oils, etc.

This invention has many advantages, some of which are apparent from the preceding discussion, and others will now be pointed out. One of the most important features of this invention is that when these magnesium compounds are used as improving agents in internal combustion engine lubricants they effect a marked reduction in the amount of varnish which forms on the piston skirt. This varnish is a brownish black, tacky resinous type of material which adheres tenaciously to the skirt of the piston and gradually builds up to a thicker and thicker layer until it eventually impedes the satisfactory operation of the piston during its to and fro motion in the cylinder. Furthermore, not only do the magnesium salts of this invention reduce the piston skirt varnish in comparison with the plain mineral oil base stocks in which they are used, but they also reduce the amount of piston skirt varnish more effectively than do the corresponding salts of other metals such as aluminum, calcium, cobalt, etc. In other words, the ability to reduce piston skirt varnish appears most characteristic of magnesium compounds.

Another important advantage of this invention is that these magnesium compounds keep the piston ring grooves particularly clean. This of course has the consequent advantage that circulation of oil through the piston ring grooves can continue freely during service, unimpeded by carbonaceous or gummy deposits in these ring grooves which form to a very serious extent with some lubricants.

Another important feature of this invention is that although these magnesium compounds, as will be shown later, have real value in improving the engine performance of lubricating oils used for practically any type of internal combustion engine, they have outstanding merit as Diesel engine lubricants, especially for lubricating Caterpillar Diesel engines. The oils compounded with magnesium derivatives serve to keep the piston skirt and lands clean, they minimize ring sticking, control crankcase deposits and reduce wear.

These and other advantages of the invention will be better understood from examination of the following engine test data:

Example 5

0.25% blends, in extracted S. A. E. 40 paraffinic lubricating oils, of the magnesium salt of tertiary amyl phenol sulfide, as prepared in Examples 1 and 2, were subjected to tests in the C. F. R. (Cooperative Fuel Research) engine for 15 hours, using a jacket temperature of 390° F. At the end of each run, the engine was taken down, inspected by demerit (the lower the better) according to the condition of the piston parts, valves and cylinders. The demerit rating of the blank oil is represented as 100 and the reference rating of the blend is expressed as "percent of reference" and is calculated as follows:

$$\text{Percent of reference} = \frac{\text{blend demerit} \times 100}{\text{blank oil demerit}}$$

The lower the "percent of reference," the better is the oil according to this engine test.

Corresponding blends in a lighter (S. A. E. 20) fraction of the same type of lubricating oil base stock, were subjected to an oxidation rate test, which comprises bubbling oxygen through a 10 gm. sample of the oil at a temperaature of 200° C. (392° F.) at a rate of 700 ccs. per min. and determining the amount of oxygen (measured in cubic centimeters) absorbed in successive 15 minute intervals. This is a test of the ability of the oil to resist oxidation and, it may be pointed out, the lower the rate at which the oxygen is absorbed the more powerful is the anti-oxidant action of the compounding agent added to the oil.

The results of these C. F. R. engine tests and oxidation rate tests are tabulated as follows:

|  | Blank | Blends containing Mg salt [1] | |
|---|---|---|---|
| Percent MgO | | 5.5 | 13.5 |
| C. F. R. demerit rating [2] | 100 | | 28 |
| Oxidation rate [3] | 74 | 30 | 132 |
| | 40 | 52 | 162 |
| | 85 | 20 | |
| | 29 | 32 | |
| Average | 57 | 34 | 147 |

[1] Salt of tertiary amyl phenol sulfide.
[2] 0.25% in S. A. E. 40 extracted paraffinic oil.
[3] 0.25% in S. A. E. 20 extracted paraffinic oil.

The above results indicate that the addition of a small amount of magnesium salt of tertiary amyl phenol sulfide reduced the C. F. R. engine demerit rating from 100% with the plain oil to 28% of reference with the blend. It will be noted that this substantial improvement in engine performance was obtained in spite of an increase in the oxidation rate, thus proving rather conclusively that ability to function as an anti-oxidant is in no way essential to the utility of the additive.

Example 6

*Caterpillar Diesel engine tests (under normal operating conditions)*

Although tests on the Caterpillar Diesel engine over a period as long as 500 hours are not available for comparing this magnesium salt of tertiary amyl phenol sulfide, some shorter tests have been run from which the merits of the magnesium salt can be judged. The long time test data are on a naphthenic lubricating oil base stock (S. A. E. 30), referred to as oil A, both used alone and together with an addition of 0.5% of cobalt tertiary amyl phenol sulfide (which is a metal salt identical with the magnesium salt described above except for the substitution of cobalt in place of magnesium). The only data on a blend of the magnesium salt in this naphthenic oil base stock when tested in the same Caterpillar Diesel engine, are 60 hour tests on a blend of 1% of the magnesium salt in oil A as compared with a blend of 0.5% of the corresponding cobalt salt in the same oil A. It is probable that the results obtained with the 1% of the magnesium salt might be better than would be obtained with only 0.5% of the magnesium salt, but the benefits derived are not at all directly proportional to the amount of the metal compound used, and consequently it must be assumed that the results obtained with the 1% of the magnesium tertiary amyl phenol sulfide are only but slightly better than would have been obtained with 0.5% of this compound. The results of these tests are as follows:

| | Hours | Overall demerit | Heat groove | Ring grooves and sides | | Skirt varnish | Oil filter |
|---|---|---|---|---|---|---|---|
| | | | | #1 and #2 | #4 and #5 | | |
| Naphthenic oil A (SAE 30) | 539 | 2.45 | 7.0 | 15.0 | 16.5 | 3.0 | 7.0 |
| Oil A+0.5% Co salt [1] | 515 | 1.61 | 7.0 | 13.0 | 15.5 | 1.0 | 3.0 |
| Oil A+0.5% Co salt [1] | 60 | 1.18 | 6.5 | 8.50 | 11.50 | 0.88 | 1.50 |
| Oil A+1% Mg salt [1] | 60 | 1.14 | 5.5 | 8.00 | 9.50 | 0.38 | 1.50 |

[1] Salt of tertiary amyl phenol sulfide.

The outstandingly important fact shown in the above test is that the blend containing 1% of the magnesium salt had a piston skirt varnish demerit rating of only 0.38 at the 60 hour check-up, whereas the blend containing 0.5% of the corresponding cobalt salt had a demerit rating of 0.88 for the skirt varnish. In other words, the magnesium salt of tertiary amyl phenol sulfide is substantially and unexpectedly superior to the corresponding cobalt salt and, in the 500 hr. check-up the blend containing the cobalt salt showed a very remarkable superiority in comparison with the blank oil not containing either metal compound. Consequently, the logical deduction is clear that the magnesium salt makes a very tremendous improvement in the engine performance in particular respect to the reduction of piston skirt varnish, compared to the plain oil. As stated earlier, in the operation of Diesel engines, of the Caterpillar type, it is highly important to reduce the piston skirt varnish formation to a minimum because in this undesirable coating which is a dark, tacky resinous material if permitted to build up increasingly thicker layers on the piston skirt it very soon impairs the efficiency of the engine to such an extent that it must be overhauled.

EXAMPLE 7

*High temperature Caterpillar test to determine copper-lead bearing corrosion*

A 1% blend of magnesium tertiary amyl phenol sulfide in naphthenic oil A was compared with the plain oil A in 60 hour comparative test runs in a Caterpillar engine equipped with a copper-lead connecting rod bearing, the test being conducted with a bearing temperature of 210° F. and an oil temperature of 195–210° F. Another similar blend of the magnesium salt was also made and the results of all three runs recorded in the following table:

to the plain oil in regard to the condition of the ring grooves, sides and the oil filter.

Thus the magnesium salt of the substituted phenols not only shows a high improvement in engine performance, particularly in the case of Diesel engines and especially the Caterpillar Diesel, but also it does so without causing the bearing corrosion loss which is usually of substantial proportions when small amounts of metal compound additives are added to oils. For instance, in the case of a nickel fatty acid soap blend run under identical conditions, the bearing loss was 5.069 gm., compared to 0.02 gm. or less for the magnesium tertiary amyl phenol sulfide.

EXAMPLE 8

A 1% solution of the magnesium salt of tert-octyl phenol thioether in a naphthenic lubricating oil base stock having a viscosity of 55 secs. Saybolt at 210° F. was subjected to a carbon black dispersion test used in evaluating sludge dispersers for use in internal combustion engine lubricants. In this test, 450 grams of the oil to be tested is heated to 225° F. and agitated in a "Mix Master" during the stepwise addition of 30 grams of carbon black. After 30 minutes of further stirring, the suspension is transferred to a graduated 500 cc. cylinder, settled for 22 hours in an oil bath at 200° F., and allowed to stand for an additional 2 hours at room temperature. In the absence of a dispersing agent, the carbon black settles out and leaves a clear supernatant layer of oil, the volume of which is recorded; the smaller this value, the better the dispersing power of the oil.

For comparison with the 1% solution of magnesium tert-octyl phenate sulfide, a sample of the blank oil was also tested.

The results of these dispersion tests are summarized as follows:

| | Cc. settled |
|---|---|
| Lube oil base stock [1] | 190 |
| Ditto +1% Mg tert-octyl phenate sulfide | 0 |

These tests indicate that the magnesium salt of the tert-octyl phenol sulfide kept the carbon

*High temperature Caterpillar engine copper-lead bearing corrosion tests*

Bearing Temp.=210° F.
Oil Temp.=195° F.–210° F.

| Oil | Hours | Engine demerits | | | | | Cu-Pb bearing Loss (g.) |
|---|---|---|---|---|---|---|---|
| | | Over-all rating | Ring grooves and sides | | Skirt varnish | Oil filter | |
| | | | #1 and #2 | #4 and #5 | | | |
| Naphthenic oil A (S. A. E. 30) | 60 | 2.01 | 22.00 | 15.00 | 2.00 | 3.0 | 0.017 |
| Oil A+1% magnesium tertiary amyl phenol sulfide | 60 | 1.00 | 8.00 | 5.75 | 0.00 | 1.00 | 0.000 |
| Do | 60 | 0.97 | 8.00 | 6.00 | 0.13 | 1.50 | 0.020 |

The results presented in the above table indicate that the two blends containing the magnesium t.-amyl phenol sulfide caused no increase in the copper-lead bearing weight loss. In the one test the loss was so small that it could not be measured by weighing on a precision balance. In the second test the weight loss with the blend was substantially the same as that observed in the blank run on oil A. It is also interesting to note that the engine demerits in the case of the two magnesium salt blends were markedly lower than in the blank run on the plain oil. For instance, magnesium salt blends had piston skirt varnish demerits of 0.00 and 0.13 as compared to 2.00 for the plain oil. Substantial superiority is also shown by the magnesium blend as compared black suspended throughout the entire volume of the oil during the tests whereas the plain oil without any of this magnesium salt, permitted a settling of 190 ccs. This shows that this magnesium salt had very substantial dispersing properties which, in an engine, should keep sludge and other deposit-forming materials from settling out on engine parts.

This invention is not to be limited to any of the specific examples presented herein which were given solely for the purpose of illustration, nor by any theory as to the mechanism of the operation of the invention, but only by the following claims in which it is desired to claim all ---
[1] The naphthenic lube oil having a viscosity of 55 sec. Saybolt at 210° F.

novelty inherent in the invention as broadly as the prior art permits.

I claim:

1. A lubricant containing a major amount of a mineral lubricating oil and a minor amount of a compound containing at least one grouping having the general formula:

$$-Mg-O-Ar(R)-Z_n-$$

wherein Ar is an aromatic nucleus, R is an aliphatic hydrocarbon group of a sufficient number of carbon atoms to render the compound soluble in the lubricant, Z is a member of the sulfur family and $n$ is an integer of 1 to 5.

2. A lubricant containing a major amount of a mineral lubricating oil and a minor amount of a compound having the general formula:

$$Mg[-O-Ar(R)]_2S_n$$

where Ar is an aromatic nucleus and R is an alkyl group containing at least four carbon atoms and in which the sulfur atoms are linked directly to the aryl nuclei and in which the magnesium atom is attached to the oxygen atom, $n$ being an integer of 1 to 5.

3. A lubricant containing a major amount of a mineral lubricating oil and a minor amount of a compound having the general formula:

$$Mg[(C_nH_{2n+1})-C_6H_3-O-]_2S$$

where $n$ is an integer or at least 4, and in which the said sulfur atom (S) is linked directly to the two said aryl nuclei ($C_6H_3$) and in which the said magnesium atom Mg is attached to the two said oxygen atoms.

4. A lubricant containing a major amount of a mineral lubricating oil and a minor amount of a magnesium salt of an alkyl phenol sulfide wherein the alkyl radical contains at least 4 carbon atoms per radical.

5. A lubricant comprising a major proportion of a mineral lubricating oil and a small amount of a compound containing at least one grouping having the general formula:

$$-Mg-O-Ar(R)-Z_n-$$

wherein Ar is an aromatic nucleus, R is an aliphatic hydrocarbon group, Z is a member of the sulfur family and $n$ is an integer of 1 to 5.

6. A lubricant comprising a major proportion of a mineral lubricating oil and a magnesium salt of an alkyl phenol sulfide wherein the alkyl radicals contain at least four carbon atoms per radical.

7. A lubricant comprising a major proportion of a mineral lubricating oil and about 0.1—5.0% of a compound having the formula:

$$Mg[(C_nH_{2n+1})-C_6H_3-O-]_2S$$

where $n$ is an interger of at least 4, and in which the said sulfur atom (S) is linked directly to the two said aryl nuclei ($C_6H_3$) and in which the said magnesium atom Mg is attached to the two said oxygen atoms.

8. A lubricant comprising a mineral oil base stock and a small amount of an oil-soluble magnesium salt of the reaction product of a sulfur halide with an alkylated aryl compound having a hydroxy group attached directly to the aryl nucleus.

9. An improved mineral oil composition comprising a mineral oil having admixed therewith a minor proportion of an oil miscible sulfide of an aykyl substituted aryl magnesium oxide in which the oxygen of the magnesium oxide group is directly attached to the aryl nucleus and in which at least two alkyl substituted aryl nuclei are interconnected by at least one atom of sulfur.

10. An improved mineral lubricating oil composition comprising a mineral lubricating oil having admixed therewith a minor proportion of an oil miscible magnesium salt of an alkylated phenol sulfide having the formula:

$$R(OH)C_6H_3-S_x-C_6H_3(OH)R'$$

in which the groups R, R', OH and $S_x$ are each connected to an aromatic nucleus ($C_6H_3$), R and R' represent alkyl groups ($C_nH_{2n+1}$) wherein $n$ is at least 4 and $x$ represents an integer, 1 or 2.

11. A lubricant comprising a mineral lubricating oil and a small amount of an oil-soluble sulfide of a magnesium alkyl phenolate in which a plurality of phenol groups are attached to a single magnesium atom.

12. A lubricant comprising a major amount of a hydrocarbon mineral lubricating oil and a minor amount of the magnesium salt of a tertiary amyl phenol sulfide.

13. A lubricant comprising a major amount of a hydrocarbon mineral lubricating oil and a minor amount of the magnesium salt of a tertiary octyl phenol sulfide.

14. A lubricating oil composition comprising a major amount of a hydrocarbon lubricating oil and a minor amount of the magnesium salt of an oil-soluble aliphatic substituted phenol sulfide, each aliphatic radical containing at least four carbon atoms.

JOHN G. McNAB.